United States Patent
Saito et al.

(10) Patent No.: US 10,239,966 B2
(45) Date of Patent: Mar. 26, 2019

(54) BLOCK COPOLYMER HYDRIDE AND STRETCHED FILM FORMED FROM SAME

(71) Applicant: ZEON CORPORATION, Chiyoda-ku, Tokyo (JP)

(72) Inventors: Daisuke Saito, Tokyo (JP); Yosuke Harauchi, Tokyo (JP); Atsushi Ishiguro, Tokyo (JP); Teiji Kohara, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 0 days.

(21) Appl. No.: 15/517,964

(22) PCT Filed: Oct. 8, 2015

(86) PCT No.: PCT/JP2015/078696
§ 371 (c)(1),
(2) Date: Apr. 10, 2017

(87) PCT Pub. No.: WO2016/060070
PCT Pub. Date: Apr. 21, 2016

(65) Prior Publication Data
US 2017/0291966 A1 Oct. 12, 2017

(30) Foreign Application Priority Data
Oct. 15, 2014 (JP) ................................ 2014-210418

(51) Int. Cl.
*C08F 297/04* (2006.01)
*C08F 8/04* (2006.01)
*C08F 212/08* (2006.01)
*C08F 236/06* (2006.01)
*C08L 47/00* (2006.01)
*C08J 5/18* (2006.01)
*G02B 5/30* (2006.01)

(52) U.S. Cl.
CPC .............. *C08F 8/04* (2013.01); *C08F 212/08* (2013.01); *C08F 236/06* (2013.01); *C08F 297/046* (2013.01); *C08J 5/18* (2013.01); *C08L 47/00* (2013.01); *G02B 5/3033* (2013.01); *C08F 2500/26* (2013.01)

(58) Field of Classification Search
CPC ........................... C08F 297/04; C08F 297/042; C08F 297/044; C08F 297/046
See application file for complete search history.

(56) References Cited

U.S. PATENT DOCUMENTS

| | | | |
|---|---|---|---|
| 6,492,468 B1* | 12/2002 | Chen ...................... | C08F 8/04 525/333.3 |
| 2003/0207983 A1* | 11/2003 | Sone ..................... | C08F 297/04 524/505 |
| 2004/0260028 A1* | 12/2004 | Sone ..................... | C08F 8/04 525/271 |
| 2013/0008506 A1 | 1/2013 | Tanahashi et al. | |
| 2013/0244367 A1 | 9/2013 | Kohara et al. | |

FOREIGN PATENT DOCUMENTS

| | | |
|---|---|---|
| CN | 101550262 A | 10/2009 |
| EP | 1229052 A1 | 8/2002 |
| JP | 2001048924 A | 2/2001 |
| JP | 2002053631 A | 2/2002 |
| JP | 2002105151 A | 4/2002 |
| JP | 2002370304 A | 12/2002 |
| JP | 2003012745 A | 1/2003 |
| JP | 2003114329 A | 4/2003 |
| JP | 2003118035 A | 4/2003 |
| WO | 0032646 A1 | 6/2000 |
| WO | 2009067290 A1 | 5/2009 |
| WO | 2011096389 A1 | 8/2011 |
| WO | 2012043708 A1 | 4/2012 |

* cited by examiner

*Primary Examiner* — Jeffrey C Mullis
(74) *Attorney, Agent, or Firm* — Kenja IP Law PC

(57) ABSTRACT

The present invention is a hydrogenated block copolymer obtained by hydrogenating a block copolymer [C] that comprises polymer blocks [A] and polymer block [B],
a ratio (wA:wB) of a weight fraction wA of the polymer blocks [A] and a weight fraction wB of the polymer block [B] in the block copolymer [C] being 45:55 to 65:35,
a ratio ($w[I_B]$:$w[II_B]$) of a weight fraction $w[I_B]$ of the repeating unit [I] derived from an aromatic vinyl compound and a weight fraction $w[II_B]$ of the repeating unit [II] derived from a linear conjugated diene compound in the polymer block [B] being 40:60 to 55:45,
90% of more of unsaturated bonds included in the block copolymer [C] having been hydrogenated,
a weight average molecular weight of 60,000 to 150,000, a low-temperature-side glass transition temperature $[Tg_1]$ of 0° C. or more and a high-temperature-side glass transition temperature $[Tg_2]$ of 135° C. or more, and
a stretched film.

3 Claims, No Drawings

BLOCK COPOLYMER HYDRIDE AND STRETCHED FILM FORMED FROM SAME

TECHNICAL FIELD

The present invention relates to a hydrogenated block copolymer wherein the soft segment has a glass transition temperature (hereinafter may be referred to as "low-temperature-side glass transition temperature" or "glass transition temperature $Tg_1$") of 0° C. or more, and the hard segment has a glass transition temperature (hereinafter may be referred to as "high-temperature-side glass transition temperature" or "glass transition temperature $Tg_2$") of 135° C. or more, and a stretched film that includes the hydrogenated block copolymer.

BACKGROUND ART

A hydrogenated aromatic vinyl compound polymer that is obtained by hydrogenating the aromatic ring of an aromatic vinyl compound polymer, and a hydrogenated block copolymer that is obtained by hydrogenating the double bonds (that are derived from an aromatic ring and a diene) of a block copolymer that includes a polymer block (a) that includes a repeating unit derived from an aromatic vinyl compound, and forms a hard segment, and a polymer block (b) that includes a repeating unit derived from a linear conjugated diene compound and forms a soft segment, exhibit significantly improved transparency, low birefringence, and heat resistance as compared with a hydrogenated block copolymer that is obtained by selectively hydrogenating only a double bond derived from a diene, and are useful as an optical film (e.g., polarizing film and retardation film) (see Patent Literature 1 to 5).

Patent Literature 1 and 2 disclose using a stretched film that is obtained by stretching a film that includes a hydrogenated block copolymer obtained by hydrogenating double bonds derived from an aromatic ring and a diene, and is provided with the desired retardation, as a liquid crystal display retardation film.

However, the stretched films disclosed in Patent Literature 1 and 2 decrease in retardation when subjected to a heat resistance test at 80° C. (that is commonly used for a liquid crystal display optical film) for about 48 hours (i.e., do not exhibit sufficiently high heat resistance), and are considerably limited as to the service temperature.

Patent Literature 3 discloses a stretched film that is obtained by stretching a film that includes a hydrogenated triblock copolymer and provided with retardation, the hydrogenated triblock copolymer having a total content of a repeating unit derived from styrene (i.e., aromatic vinyl compound) of 87 wt %, wherein the hard segment is a polymer block formed of styrene, and the soft segment is a copolymer block that includes styrene and isoprene (i.e., linear conjugated diene compound).

However, the hydrogenated block copolymer disclosed in Patent Literature 3 has a glass transition temperature (hereinafter may be referred to as "glass transition temperature Tg") measured by DSC analysis of 127° C., and does not exhibit sufficiently high heat resistance.

Patent Literature 4 discloses a retardation film that is obtained by stretching a hydrogenated pentablock copolymer that has a total content of a repeating unit derived from styrene of 60 wt %, and includes a polymer block formed of styrene, and a polymer block formed of butadiene. Patent Literature 4 does not disclose the glass transition temperature Tg of the hydrogenated pentablock copolymer. A hydrogenated pentablock copolymer that was synthesized using the method disclosed in Patent Literature 4 had a glass transition temperature Tg of 120° C. or less, and does not exhibit sufficient heat resistance.

Patent Literature 5 discloses a hydrogenated block copolymer wherein the soft segment is a copolymer block that includes a linear conjugated diene compound and an aromatic vinyl compound, wherein the content of the aromatic vinyl compound is lower than that of the linear conjugated diene compound. Patent Literature 5 states that the hydrogenated block copolymer exhibits improved thermal deformation resistance, mechanical properties, transparency, and the like. The hydrogenated block copolymer disclosed in Patent Literature 5 has a total styrene content of 85 wt %, includes a polymer block formed of styrene as a hard segment, includes a copolymer block formed of styrene and isoprene as a soft segment, has a glass transition temperature $Tg_1$ measured by dynamic mechanical analysis (DMA) of −33° C., and has a glass transition temperature $Tg_2$ measured by DMA of 132° C. The glass transition temperature $Tg_1$ of the soft segment included in the hydrogenated block copolymer disclosed in Patent Literature 5 is higher than that (−50° C.) of a soft segment that is formed by hydrogenating a polymer block formed of isoprene.

However, a retardation film that includes a hydrogenated block copolymer that has the same glass transition temperature $Tg_1$ and glass transition temperature $Tg_2$ as those of the hydrogenated block copolymer disclosed in Patent Literature 5 decreases in retardation when allowed to stand at a temperature of 80° C., and does not exhibit a heat resistance sufficient for an optical film.

Patent Literature 6 to 9 disclose a hydrogenated block copolymer that includes a polymer block derived from an aromatic vinyl compound, and a copolymer block wherein the weight ratio of an aromatic vinyl compound is larger than that of a linear conjugated diene compound.

Patent Literature 6 and 8 disclose a hydrogenated triblock copolymer that has a total styrene content of 80 wt %, wherein the hard segment is a polymer block formed of styrene, and the soft segment is a copolymer block in which the styrene:butadiene weight ratio is 50:50, and the styrene:isoprene weight ratio is 40:20.

However, the hydrogenated triblock copolymer disclosed in Patent Literature 6 has a softening temperature measured by a thermomechanical analyzer (TMA) of 127° C., and the hydrogenated triblock copolymer disclosed in Patent Literature 8 has a softening temperature measured by a thermomechanical analyzer (TMA) of 129° C. (i.e., do not exhibit sufficiently high heat resistance).

Patent Literature 6 and 8 also disclose a hydrogenated pentablock copolymer that has a total styrene content of 80 wt %, wherein the hard segment is a polymer block formed of styrene, and the soft segment is a polymer block formed of isoprene, the hydrogenated pentablock copolymer having a polystyrene-polyisoprene-polystyrene-polyisoprene-polystyrene block configuration. However, the hydrogenated pentablock copolymer has a softening temperature of 116° C., and exhibits a heat resistance lower than that of the hydrogenated triblock copolymer.

Patent Literature 7 discloses a hydrogenated triblock copolymer that has a total styrene content of 85 wt %, wherein the hard segment is a polymer block formed of styrene, and the soft segment is a copolymer block in which the styrene:isoprene weight ratio is 19:15.

However, the hydrogenated triblock copolymer disclosed in Patent Literature 7 has a glass transition temperature Tg measured by DSC analysis of 125.5° C., and does not exhibit sufficiently high heat resistance.

Patent Literature 9 discloses a hydrogenated triblock copolymer that has a total styrene content of 80 wt %, wherein the hard segment is a polymer block formed of styrene, and the soft segment is a copolymer block in which the styrene:isoprene weight ratio is 30:20.

However, the hydrogenated triblock copolymer disclosed in Patent Literature 9 has a softening temperature measured by a TMA of 128° C., and does not exhibit sufficiently high heat resistance.

As described above, a number of pieces of literature disclose a hydrogenated block copolymer wherein the hard segment is a polymer block derived from an aromatic vinyl compound, and the soft segment is a copolymer block derived from a linear conjugated diene compound and an aromatic vinyl compound. However, these hydrogenated block copolymers do not necessarily exhibit a heat resistance sufficient for an optical film used for a liquid crystal display.

CITATION LIST

Patent Literature

Patent Literature 1: JP-A-2001-48924 (EP1229052A1)
Patent Literature 2: JP-A-2002-105151 (US2003/0207983A1)
Patent Literature 3: JP-A-2003-114329
Patent Literature 4: WO2009/067290
Patent Literature 5: WO2000/032646
Patent Literature 6: JP-A-2002-370304
Patent Literature 7: JP-A-2002-53631 (US2003/0207983A1)
Patent Literature 8: JP-A-2003-012745
Patent Literature 9: JP-A-2003-118035

SUMMARY OF INVENTION

Technical Problem

The invention was conceived in view of the above situation. An object of the invention is to provide a novel hydrogenated block copolymer that exhibits improved heat resistance, and a stretched film that includes the hydrogenated block copolymer, and exhibits improved heat resistance with respect to a change in retardation.

Solution to Problem

The inventors conducted extensive studies with the aim to improve the heat resistance of a hydrogenated block copolymer that includes a polymer block that is derived from an aromatic vinyl compound and forms a hard segment, and a copolymer block that is derived from an aromatic vinyl compound and a linear conjugated diene compound and forms a soft segment, by increasing the glass transition temperature $Tg_1$ of the soft segment that includes the copolymer block derived from an aromatic vinyl compound and a linear conjugated diene compound.

As a result, the inventors found that the heat resistance of the hydrogenated block copolymer (formed article) decreases when the content of a repeating unit derived from an aromatic vinyl compound in the copolymer block that is derived from an aromatic vinyl compound and a linear conjugated diene compound and forms a soft segment is higher than a specific value, whereby the glass transition temperature $Tg_2$ of the hydrogenated block copolymer decreases.

The inventors also found that a hydrogenated block copolymer that exhibits improved heat resistance while maintaining mechanical strength and flexibility, in which the hard segment has a high glass transition temperature $Tg_2$, and the soft segment has a moderate glass transition temperature $Tg_1$, can be obtained when the copolymer block that forms the soft segment includes an aromatic vinyl compound and a linear conjugated diene compound in a weight ratio within a specific range, and the hydrogenated block copolymer includes the hard segment and the soft segment in a weight ratio within a specific range, and a stretched film obtained using the hydrogenated block copolymer decreases in retardation to only a small extent when subjected to a heat resistance test. These findings have led to the completion of the invention.

Several aspects of the invention provide the following hydrogenated block copolymer (see (1)) and stretched film that includes the hydrogenated block copolymer (see (2)).

(1) A hydrogenated block copolymer obtained by hydrogenating a block copolymer [C] that includes two polymer blocks [A] and one polymer block [B], the polymer blocks [A] including a repeating unit [I] derived from an aromatic vinyl compound as the main component, and the polymer block [B] including a repeating unit [I] derived from an aromatic vinyl compound and a repeating unit [II] derived from a linear conjugated diene compound as the main components, (i) the ratio (wA:wB) of the total weight fraction wA of the polymer blocks [A] in the block copolymer [C] to the weight fraction wB of the polymer block [B] in the block copolymer [C] being 45:55 to 65:35, (ii) the ratio ($w[I_B]$:$w[II_B]$) of the weight fraction $w[I_B]$ of the repeating unit [I] derived from an aromatic vinyl compound in the polymer block [B] to the weight fraction $w[II_B]$ of the repeating unit [II] derived from a linear conjugated diene compound in the polymer block [B] being 40:60 to 55:45, (iii) 90% of more of the unsaturated bonds included in the block copolymer [C] having been hydrogenated, (iv) the hydrogenated block copolymer having a weight average molecular weight of 60,000 to 150,000, and (v) the hydrogenated block copolymer having a low-temperature-side glass transition temperature [$Tg_1$] determined by dynamic viscoelastic measurement of 0° C. or more, and having a high-temperature-side glass transition temperature [$Tg_2$] determined by dynamic viscoelastic measurement of 135° C. or more.

(2) A stretched film including the hydrogenated block copolymer according to (1).

Advantageous Effects of Invention

Several aspects of the invention thus provide a novel hydrogenated block copolymer that exhibits improved heat resistance, and a stretched film that includes the hydrogenated block copolymer, and exhibits improved heat resistance with respect to a change in retardation.

DESCRIPTION OF EMBODIMENTS

1. Hydrogenated Block Copolymer

A hydrogenated block copolymer according to one embodiment of the invention (hereinafter may be referred to as "hydrogenated block copolymer [D]") is a polymer obtained by hydrogenating 90% or more of the unsaturated bonds included in a block copolymer [C] (precursor).

The block copolymer [C] includes two polymer blocks [A] and one polymer block [B].

Polymer Block [A]

The polymer block [A] includes a repeating unit [I] derived from an aromatic vinyl compound as the main component.

The content of the repeating unit [I] derived from an aromatic vinyl compound in the polymer block [A] is normally 98 wt % or more, and preferably 99 wt % or more.

The polymer block [A] may include either or both of a repeating unit [II] derived from a linear conjugated diene and a repeating unit [III] derived from an additional vinyl compound, in addition to the repeating unit [I] derived from an aromatic vinyl compound. The content of either or both of the repeating unit [II] derived from a linear conjugated diene and the repeating unit [III] derived from an additional vinyl compound in the polymer block [A] is 2 wt % or less, and preferably 1 wt % or less.

If the content of either or both of the repeating unit [II] derived from a linear conjugated diene and the repeating unit [III] derived from an additional vinyl compound in the polymer block [A] is too high, the hard segment included in the hydrogenated block copolymer [D] according to one embodiment of the invention may have a low glass transition temperature $Tg_2$, and a stretched film that includes the hydrogenated block copolymer may exhibit low heat resistance.

The two polymer blocks [A] included in the block copolymer [C] may be either identical to or different from each other as long as the above ranges are satisfied.

Polymer Block [B]

The polymer block [B] includes a repeating unit [I] derived from an aromatic vinyl compound and a repeating unit [II] derived from a linear conjugated diene compound as the main components.

The ratio ($w[I_B]$:$w[II_B]$) of the weight fraction $w[I_B]$ of the repeating unit [I] derived from an aromatic vinyl compound in the polymer block [B] to the weight fraction $w[II_B]$ of the repeating unit [II] derived from a linear conjugated diene compound in the polymer block [B] is 40:60 to 55:45, preferably 45:55 to 54:46, and more preferably 50:50 to 53:47.

The total content of the repeating unit [I] derived from an aromatic vinyl compound and the repeating unit [II] derived from a linear conjugated diene compound in the polymer block [B] is 95 wt % or more, preferably 97 wt % or more, and more preferably 99 wt % or more.

The polymer block [B] may include a repeating unit [III] derived from an additional vinyl compound in addition to the repeating unit [I] derived from an aromatic vinyl compound and the repeating unit [II] derived from a linear conjugated diene compound. The content of the repeating unit [III] derived from an additional vinyl compound in the polymer block [B] is 5 wt % or less, preferably 3 wt % or less, and more preferably 1 wt % or less.

When the content of the repeating unit [I] derived from an aromatic vinyl compound and the repeating unit [II] derived from a linear conjugated diene compound in the polymer block [B] is within the range, the hydrogenated block copolymer [D] according to one embodiment of the invention and a stretched film that includes the hydrogenated block copolymer [D] exhibit improved heat resistance with respect to a change in retardation while maintaining mechanical strength and flexibility. If the content of the repeating unit [I] derived from an aromatic vinyl compound in the polymer block [B] is less than the above range, a stretched film that includes the hydrogenated block copolymer [D] according to one embodiment of the invention may exhibit insufficient heat resistance due to a low glass transition temperature $Tg_1$.

If the content of the repeating unit [I] derived from an aromatic vinyl compound in the polymer block [B] exceeds the above range, the hydrogenated block copolymer [D] may not have a glass transition temperature $Tg_1$ and a glass transition temperature $Tg_2$ that are distinct from each other, and may have a single low glass transition temperature (Tg) (i.e., may exhibit low heat resistance).

Aromatic Vinyl Compound

Examples of the aromatic vinyl compound include styrene; styrenes that is substituted with an alkyl group having 1 to 6 carbon atoms, such as α-methylstyrene, 2-methylstyrene, 3-methyl styrene, 4-methyl styrene, 2,4-diisopropylstyrene, 2,4-dimethylstyrene, 4-t-butylstyrene, and 5-t-butyl-2-methylstyrene; styrenes that is substituted with a halogen atom, such as 4-chlorostyrene, dichlorostyrene, and 4-monofluorostyrene; styrenes that is substituted with an alkoxy group having 1 to 6 carbon atoms, such as 4-methoxystyrene; styrenes that is substituted with an aryl group, such as 4-phenylstyrene; vinylnaphthalenes such as 1-vinylnaphthalene and 2-vinylnaphthalene; and the like. An aromatic vinyl compound that does not include a polar group (e.g., styrene and styrenes that is substituted with an alkyl group having 1 to 6 carbon atoms) is preferable from the viewpoint of hygroscopicity, and styrene is particularly preferable from the viewpoint of industrial availability.

Linear Conjugated Diene Compound

Examples of the linear conjugated diene compound include 1,3-butadiene, isoprene, 2,3-dimethyl-1,3-butadiene, 1,3-pentadiene, and the like. A linear conjugated diene compound that does not include a polar group is preferable from the viewpoint of hygroscopicity, and 1,3-butadiene and isoprene are particularly preferable from the viewpoint of industrial availability.

Additional Vinyl Compound

Examples of the additional vinyl compound include a linear olefin compound, a cycloolefin compound, an unsaturated cyclic acid anhydride, an unsaturated imide compound, and the like. These compounds may be substituted with a nitrile group, an alkoxycarbonyl group, a hydroxycarbonyl group, or a halogen atom.

A vinyl compound that does not include a polar group, such as a linear olefin compound having 2 to 20 carbon atoms (e.g., ethylene, propylene, 1-butene, 1-pentene, 1-hexene, 1-heptene, 1-octene, 1-nonene, 1-decene, 1-dodecene, 1-eicosene, 4-methyl-1-pentene, and 4,6-dimethyl-1-heptene), and a cycloolefin compound having 5 to 20 carbon atoms (e.g., vinylcyclohexane, 4-vinylcyclohexene, and norbornene), is preferable from the viewpoint of hygroscopicity, a linear olefin compound having 2 to 20 carbon atoms is more preferable, and ethylene and propylene are particularly preferable.

Block Copolymer [C]

The block copolymer [C] is a precursor for producing the hydrogenated block copolymer [D]. The block copolymer [C] includes two polymer blocks [A] and one polymer block [B].

The two polymer blocks [A] included in the block copolymer [C] may be identical to or different from each other as to the weight average molecular weight. The weight average molecular weight Mw(A) of each of the two polymer blocks [A] is 3,000 to 90,000, preferably 3,500 to 80,000, and more preferably 4,000 to 60,000.

If the weight average molecular weight Mw(A) of one of the two polymer blocks [A] is less than 30,000, the resulting hydrogenated block copolymer [D] may exhibit low mechanical strength. If the weight average molecular weight Mw(A) of one of the two polymer blocks [A] exceeds 90,000, the resulting hydrogenated block copolymer [D] may exhibit inferior melt-formability.

The ratio (wA:wB) of the total weight fraction wA of the polymer blocks [A] in the block copolymer [C] to the weight fraction wB of the polymer block [B] in the block copolymer [C] is normally 45:55 to 65:35, preferably 47:53 to 63:37, and more preferably 50:50 to 60:40. If the weight fraction wA is too high, the resulting hydrogenated block copolymer [D] may exhibit low flexibility and low mechanical strength. If the weight fraction wA is too low, the resulting hydrogenated block copolymer [D] may exhibit low heat resistance.

The molecular weight (polystyrene-equivalent weight average molecular weight (Mw)) of the block copolymer [C] determined by gel permeation chromatography (GPC) (eluent: tetrahydrofuran (THF)) is normally 60,000 to 150,000, preferably 65,000 to 130,000, and more preferably 70,000 to 100,000. The molecular weight distribution (Mw/Mn) of the block copolymer [C] is preferably 3 or less, more preferably 2 or less, and particularly preferably 1.5 or less.

The block copolymer [C] may be produced using a method that alternately polymerizes a monomer mixture (a) that includes an aromatic vinyl compound as the main component, and a monomer mixture (b) that includes an aromatic vinyl compound and a linear conjugated diene compound as the main components, by means of living anionic polymerization or the like; a method that sequentially polymerizes a monomer mixture (a) that includes an aromatic vinyl compound as the main component, and a monomer mixture (b) that includes an aromatic vinyl compound and a linear conjugated diene compound as the main components, and couples the terminals of the resulting polymer block [B] using a coupling agent; or the like.

When polymerizing the monomer mixture (b) that includes an aromatic vinyl compound and a linear conjugated diene compound as the main components to form the polymer block [B], it is preferable to continuously add the monomer mixture (b) to the polymerization reaction system in small quantity (since an aromatic vinyl compound and a linear conjugated diene compound considerably differ in polymerization rate) to form a copolymer block [B] having a homogeneous monomer composition, so that a soft segment derived from the copolymer block [B] has a glass transition temperature $Tg_1$ of 0° C. or more when the resulting block copolymer [C] is hydrogenated to produce the hydrogenated block copolymer [D].

If the monomer mixture (b) is promptly added to the polymerization reaction system, a linear conjugated diene having a high polymerization rate may be polymerized preferentially, whereby the polymer block [B] may be tapered, and the soft segment included in the hydrogenated block copolymer [D] may have a glass transition temperature $Tg_1$ of less than 0° C. As a result, a stretched film produced using the hydrogenated block copolymer [D] may exhibit decreased heat resistance with respect to a change in retardation.

Hydrogenated Block Copolymer [D]

The hydrogenated block copolymer [D] according to one embodiment of the invention is obtained by hydrogenating the carbon-carbon unsaturated bonds included in the main chain, the side chain, and the aromatic ring of the block copolymer [C].

The hydrogenation rate of the hydrogenated block copolymer [D] is normally 95% or more, preferably 97% or more, and more preferably 99% or more. The resulting formed article exhibits better weatherability, heat resistance, and transparency as the hydrogenation rate increases. The hydrogenation rate of the hydrogenated block copolymer [D] may be determined by $^1$H-NMR analysis, or may be determined by comparing the peak areas detected by a UV detector and an RI detector by means of GPC analysis, for example.

The unsaturated bond hydrogenation method, the reaction method, and the like are not particularly limited. The unsaturated bonds may be hydrogenated using a known method. It is preferable to use a hydrogenation method that can increase the hydrogenation rate, and causes a polymer chain cleavage reaction to only a small extent. Examples of such a hydrogenation method include the method disclosed in WO2011/096389, the method disclosed in WO2012/043708, and the like.

After completion of the hydrogenation reaction, either or both of a hydrogenation catalyst and a polymerization catalyst are removed from the reaction solution, and the hydrogenated block copolymer [D] is collected from the residue (solution). The hydrogenated block copolymer [D] thus collected is normally pelletized, and subjected to the subsequent film-forming process, for example.

The weight average molecular weight (Mw) (polystyrene-equivalent weight average molecular weight) of the hydrogenated block copolymer [D] determined by GPC (eluent: THF) is normally 50,000 to 150,000, preferably 55,000 to 130,000, and more preferably 60,000 to 100,000.

The molecular weight distribution (Mw/Mn) of the hydrogenated block copolymer [D] is preferably 3 or less, more preferably 2 or less, and particularly preferably 1.5 or less. When the weight average molecular weight (Mw) and the molecular weight distribution (Mw/Mn) of the hydrogenated block copolymer [D] are within the above ranges, the resulting stretched film exhibits excellent heat resistance with respect to a change in retardation, and exhibits excellent mechanical strength.

A polymer block obtained by hydrogenating the polymer block [A] included in the block copolymer [C], and a polymer block obtained by hydrogenating the polymer block [B] included in the block copolymer [C], respectively form the hard segment and the soft segment that are included in the hydrogenated block copolymer [D].

When the ratio ($w[I_B]:w[II_B]$) of the weight fraction $w[I_B]$ of the repeating unit [I] derived from an aromatic vinyl compound in the polymer block [B] to the weight fraction $w[II_B]$ of the repeating unit [II] derived from a linear conjugated diene compound in the polymer block [B] is 40:60 to 55:45, the hydrogenated block copolymer [D] has a low-temperature-side glass transition temperature [$Tg_1$] (due to the soft segment) of 0° C. or more.

When the ratio (wA:wB) of the total weight fraction wA of the polymer blocks [A] in the block copolymer [C] to the weight fraction wB of the polymer block [B] in the block copolymer [C] is 45:55 to 65:35, and the hydrogenated block copolymer [D] has a weight average molecular weight (Mw) of 60,000 to 150,000, the hydrogenated block copolymer [D] has a high-temperature-side glass transition temperature [$Tg_2$] (derived from the hard segment) of 135° C. or more.

Additive

An additive such as a stabilizer (e.g., antioxidant, UV absorber, and light stabilizer), a resin modifier (e.g., lubricant and plasticizer), a colorant (e.g., dye and pigment), and an antistatic agent, may be added (used) when melt-forming the hydrogenated block copolymer [D] according to one embodiment of the invention. These additives may be used either alone or in combination. The amount of each additive is appropriately selected so that the object of the invention is not impaired.

2. Stretched film

A stretched film (hereinafter may be referred to as "stretched film [F]") that is formed of the hydrogenated block copolymer [D] according to one embodiment of the invention is obtained by melt-extruding the specific hydrogenated block copolymer [D] (see above) to obtain an unstretched film (hereinafter may be referred to as "unstretched film [E]"), and uniaxially or biaxially stretching the unstretched film in either or both of the lengthwise direction and the width direction, or stretching the unstretched film diagonally (at a specific angle) with respect to the width direction.

Unstretched Film [E] that includes Hydrogenated Block Copolymer [D]

The unstretched film [E] is a precursor for producing the stretched film [F] according to one embodiment of the invention. The unstretched film [E] may be obtained by melt-extruding pellets of the hydrogenated block copolymer [D] using an extruder. The pellets of the hydrogenated block copolymer [D] are normally held at 50 to 110° C. (preferably 60 to 100° C., and more preferably 70 to 100° C.) for 2 hours or more before melt-extruding the pellets of the hydrogenated block copolymer [D] using an extruder. The amount of dissolved air in the pellets of the hydrogenated block copolymer [D] is reduced, and a variation in thickness of the extruded film and the occurrence of a die line are suppressed by heating the pellets of the hydrogenated block copolymer [D] under the above conditions. This makes it possible to uniformly stretch the resulting film in the subsequent stretching step.

If the heating temperature and the heating time are less than the above ranges, only a small amount of dissolved air may be removed, and it may be difficult to sufficiently suppress a variation in thickness of the extruded film and the occurrence of a die line. If the heating temperature and the heating time exceed the above ranges, the pellets of the hydrogenated block copolymer [D] may easily undergo a blocking phenomenon, and it may be difficult to extrude the pellets of the hydrogenated block copolymer [D].

The amount of dissolved air removed by heating is normally 100 ppm or more, and preferably 150 ppm or more. The amount of dissolved air released by heating the pellets may be determined from the weight loss of the pellets due to heating. If the pellets are allowed to stand at room temperature after reducing the amount of dissolved air in the pellets by heating, the pellets absorb air even in an atmosphere that does not include water. Therefore, it is necessary to subject the pellets to the melt extrusion step while maintaining the pellets in a heated state, or subject the pellets to the melt extrusion step before the pellets absorb air after cooling. It is preferable to subject the pellets to the melt extrusion step within 1 hour (more preferably 0.5 hours) after cooling.

The unstretched film [E] may normally be obtained by melting the hydrogenated block copolymer [D] using an extruder, extruding the molten hydrogenated block copolymer [D] in the shape of a film from a T-die provided to the extruder, forming the extruded film by bringing the extruded film into contact with at least one cooling roll, and taking up the formed article.

The melt extrusion conditions are appropriately selected taking account of the composition and the molecular weight of the hydrogenated block copolymer [D], and the like. The cylinder temperature of the extruder is normally set within a range from 190 to 280° C., and preferably from 200 to 260° C. The temperature of the cooling roll of the film take-up device is normally set within a range from 50 to 200° C., and preferably from 70 to 180° C.

The thickness of the unstretched film [E] obtained by melt extrusion may be appropriately determined taking account of the intended use of the stretched film [F] and the like. The thickness of the unstretched film [E] is normally 40 to 200 µm, and preferably 50 to 150 µm, since a uniform stretched film can be obtained by a stable stretching process.

Since the unstretched film [E] may be provided with the desired retardation in the subsequent stretching step, it is preferable that the unstretched film [E] have an in-plane retardation (wavelength: 550 nm) of 30 nm or less, more preferably 20 nm or less, and still more preferably 10 nm or less.

The unstretched film [E] may be would in the shape of a roll, and subjected to the subsequent stretching step, or may be subjected directly to the subsequent stretching step.

Stretched Film [F]

The stretched film [F] according to one embodiment of the invention is obtained by stretching the unstretched film [E] obtained by melt-extruding the hydrogenated block copolymer [D] preferably at a temperature range from $(Tg_2-10°$ C.) to $(Tg_2+30°$ C.) (wherein $Tg_2$ is the glass transition temperature of the hard segment included in the hydrogenated block copolymer [D]), and more preferably from $(Tg_2-5°$ C.) to $(Tg_2+20°$ C.), in at least one direction at a stretching ratio of 1.05 to 4, preferably 1.2 to 3.5, and more preferably 1.5 to 3.

It suffices that the unstretched film [E] be stretched in at least one direction. The unstretched film [E] is stretched in the machine direction (hereinafter may be referred to as "MD direction"), the transverse direction (hereinafter may be referred to as "TD direction"), a diagonal direction at an arbitrary angle with respect to the transverse direction, or an arbitrary two directions among these directions.

The stretching method is not particularly limited, and a known stretching method may be used. For example, the unstretched film may be stretched using a uniaxial stretching method such as a method that uniaxially stretches the unstretched film in the machine direction by utilizing the difference in circumferential speed between rolls, or a method that uniaxially stretches the unstretched film in the transverse direction using a tenter-type stretching machine; a biaxial stretching method such as a simultaneous biaxial stretching method that stretches the unstretched film in the machine direction by increasing the interval between holding clips while stretching the unstretched film in the transverse direction by utilizing the spread angle of a guide rail, or a successive biaxial stretching method that stretches the unstretched film in the machine direction by utilizing the difference in circumferential speed between rolls, and stretches the unstretched film in the transverse direction using a tenter-type stretching machine while holding each end of the film using a clip; a method that continuously stretches the unstretched film diagonally at an arbitrary angle theta with respect to the widthwise direction of the film using a tenter-type stretching machine that can apply a feeding force, a tensile force, or a take-up force that differs in speed in the transverse direction or the machine direction; or the like.

When the unstretched film is uniaxially stretched in the MD direction, the following steps (1) to (4) are performed.

(1) A sheet that has been extruded through the T-die of the extruder is held at the stretching temperature while being passed through a heating roll heated at a specific temperature.
(2) The sheet that is held at the specific temperature is passed (stretched) through a first roll that is rotated at a relatively low rotational speed and a second roll that is rotated at a relatively high (higher) rotational speed to obtain a film. The stretching ratio can be adjusted to an arbitrary value within a range from 1.05 to 4 by controlling the ratio of the rotational speed of the first roll to the rotational speed of the second roll. It is preferable to provide an infrared heater or the like between the heating roll, the first roll, and the second roll in order to stretch the sheet at a constant stretching temperature.
(3) The stretched film is passed (cooled) through a cooling roll.
(4) The stretched film that has been cooled using the cooling roll is wound around a take-up roll. The stretched film may be wound in a state in which a masking film is stacked thereon, or may be wound in a state in which a tape or the like is bonded to at least one edge (preferably each edge) of the film, in order to prevent a situation in which a blocking phenomenon occurs.

When passing the extruded film through the heating roll in the step (1), the extruded film may be passed through the heating roll while cooling the extruded film to a temperature close to the temperature of the heating roll. When it is desired to increase the stretching ratio, it is preferable to cool the extruded film to room temperature, wind the cooled extruded film around a roll, and pass the extruded film through the heating roll using a stretching device while drawing the extruded film from the roll.

The stretching speed is preferably 5 to 1,000 mm/sec, and more preferably 10 to 750 mm/sec. When the stretching speed is within the above range, it is possible to easily control the stretching process, and the resulting film can be used as a retardation film over a wide wavelength band, for example. t is also possible to reduce a variation in in-plane accuracy and in-plane retardation.

It is preferable to form and stretch the unstretched film [E] in a clean room. In this case, the class of the clean room is preferably higher than Class 100,000, and more preferably higher than Class 10,000. When the unstretched film [E] is formed and stretched in a clean room, it is possible to prevent a situation in which foreign matter adheres to the film, and the film is damaged during stretching, for example.

When the stretched film [F] according to one embodiment of the invention is used as a retardation film or a zero retardation film, the unstretched film [E] is stretched to have the desired retardation. The term "retardation film" used herein refers to a film that provides a given retardation when linearly polarized lights that vibrate in directions that are orthogonal to each other pass through the film.

For example, when the stretched film according to one embodiment of the invention is used as a quarter-wave plate, the unstretched film [E] is preferably stretched to have a retardation (wavelength: 550 nm) of 110 to 150 nm. When the stretched film according to one embodiment of the invention is used as a half-wave plate, the unstretched film [E] is preferably stretched to have a retardation (wavelength: 550 nm) of 250 to 300 nm.

The stretching ratio may be appropriately selected taking account of the desired retardation and the thickness of the retardation film.

When the stretched film [F] according to one embodiment of the invention is used as a polarizer protective film, the stretching ratio in the MD direction and the stretching ratio in the TD direction used for biaxial stretching may be adjusted to obtain a retardation of 10 nm or less, and preferably 5 nm or less.

The hydrogenated block copolymer [D] according to one embodiment of the invention exhibits excellent heat resistance as compared with a known hydrogenated block copolymer that includes a polymer block derived from an aromatic vinyl compound, and a copolymer block derived from an aromatic vinyl compound and a linear conjugated diene compound. Therefore, the hydrogenated block copolymer [D] according to one embodiment of the invention is useful as a raw material for producing a retardation film, a polarizer protective film, an optically clear adhesive film (OCA film), a light guide plate, and an optical diffuser used for a liquid crystal display, and the like.

Since the hydrogenated block copolymer [D] according to one embodiment of the invention exhibits excellent transparency and low birefringence, the hydrogenated block copolymer [D] according to one embodiment of the invention is also useful as a material for producing an optical part such as an optical lens, a prism, a mirror, an optical disk substrate, and a medical test cell; a medical container such as an injection syringe, a prefilled syringe, a vial, an ampoule, an infusion bag, an eye drop container, a sample container, a blood sampling tube, a blood test tube, and a sample container (since the hydrogenated block copolymer [D] according to one embodiment of the invention is transparent, allows the contents to be observed from the outside, and can be subjected to steam sterilization and γ-ray sterilization); a culture vessel such as a dish, a bio plate, a well plate, a cell culture vessel, and a bioreactor; an electrical part such as a coil bobbin, a connector, a housing for a liquid crystal television, a compact camera, a power tool, a video camera, a microwave oven, an electric rice-cooker, a pot, a cleaner, a personal computer, a copier, a printer, and the like, a motor cover, a motor fan, and a wire coating material; a building interior material such as a wall material, a make-up sheet, an artificial marble material, a handrail material, a water tank, and a pipe; a electronic part treatment tool such as a tool that comes in contact with an electronic part (e.g., a semiconductor device (e.g., IC and LSI), a hybrid IC, a liquid crystal display, and a light-emitting diode, a tool that comes in contact with a production intermediate (e.g., wafer and liquid crystal substrate (on which a transparent electrode layer, a protective layer, and the like are optionally stacked)), and a tool that comes in contact with a treatment liquyid (e.g., chemical and ultrapure water) that is used to treat a production intermediate used to produce an electronic part (e.g., tank, tray, carrier, case, wafer shipper, FOUP, FOSB, carrier tape, separation film, chemical pipe, tube, valve, flowmeter, filter, pump, sampling container, bottle, and ampoule); a food container such as a microwave oven container, a nursing bottle, a convenience food container, a bottle, and tableware; and the like.

EXAMPLES

The invention is further described below by way of examples. Note that the invention is not limited to the following examples. Note that the units "parts" and "%" respectively refer to "parts by weight" and "wt %" unless otherwise indicated.

The measurement methods and the evaluation methods used in connection with the examples are described below.

(1) Weight average molecular weight (Mw) and molecular weight distribution (Mw/Mn)

The molecular weight of the block copolymer and the molecular weight of the hydrogenated block copolymer were determined by GPC (temperature: 38° C., eluent: THF) as standard polystyrene-equivalent values. An HLC-8020 GPC system manufactured by Tosoh Corporation was used to measure the molecular weight.

(2) Hydrogenation Rate

The hydrogenation rate of the hydrogenated block copolymer [D] refers to the ratio of the number of hydrogenated carbon-carbon bonds to the total number of carbon-carbon unsaturated bonds included in the aromatic ring of the repeating unit derived from the aromatic vinyl compound included in the block copolymer (precursor), and carbon-carbon unsaturated bonds included in the repeating unit derived from the linear conjugated diene compound included in the block copolymer (precursor).

The hydrogenation rate of the hydrogenated block copolymer [D] was calculated from the $^1$H-NMR spectrum, or calculated by GPC analysis. More specifically, a hydrogenation rate equal to or less than 99% was calculated from the $^1$H-NMR spectrum, and a hydrogenation rate exceeding 99% was calculated from the ratio of the peak areas detected by a UV detector and an RI detector by means of GPC analysis.

(3) Glass Transition Temperature (Tg)

The hydrogenated block copolymer [D] was pressed to prepare a specimen having a length of 50 mm, a width of 10 mm, and a thickness of 1 mm. The viscoelastic spectrum of the specimen was measured in accordance with JIS K 7244-4 using a viscoelasticity measurement device ("ARES" manufactured by TA Instruments Japan Inc.) (temperature range: −100 to +150° C., heating rate: 5° C./min). The glass transition temperature $Tg_1$ derived from the soft segment was calculated from the low-temperature-side peak top temperature (with respect to the loss tangent tan δ), and the glass transition temperature $Tg_2$ derived from the hard segment was calculated from the high-temperature-side peak top temperature (with respect to the loss tangent tan δ).

(4) Softening Temperature (Hereinafter May be Referred to as "Softening Temperature Ts")

The hydrogenated block copolymer [D] was pressed to prepare a specimen having a length of 10 mm, a width of 10 mm, and a thickness of 3 mm. The softening temperature of the specimen was measured using a thermomechanical analyzer ("TMA/SS6100" manufactured by Seiko Instruments Inc.) (needle mode probe, load: 5 g, temperature range: 25 to 160° C., heating rate: 10° C./min).

(5) Thickness of Film

The thickness of the film was measured using a thickness gauge ("RC-1 ROTARY CALIPER" manufactured by Maysun Co., Ltd.) at five points that were situated at equal intervals in the width direction, and the average value was taken as the thickness of the film.

(6) In-Plane Retardation (Re) of Film

The retardation (wavelength: 590 nm) of the film was measured using a retardation meter ("KOBRA-21ADH" manufactured by Oji Scientific Instruments Co., Ltd.) at five points that were situated at equal intervals in the width direction, and the average value was taken as the in-plane retardation (Re) of the film.

(7) Heat Resistance of Stretched Film

The stretched film [F] formed of the hydrogenated block copolymer [D] was cut to prepare a 5×5 cm square film. After measuring the in-plane retardation of the film, the film was allowed to stand at 80° C. for 100 hours in an oven, and the in-plane retardation of the film was measured again. The retardation retention ratio (%) was calculated using the following expression. Note that $Re^0$ is the in-plane retardation of the film measured before the film was allowed to stand at 80° C. for 100 hours in an oven, and Re is the in-plane retardation of the film measured after the film was allowed to stand at 80° C. for 100 hours in an oven.

Retardation retention ratio=$Re/Re^0 \times 100$

The heat resistance of the stretched film was evaluated as "Good" when the retardation retention ratio was 97% or more, and evaluated as "Bad" when the retardation retention ratio was less than 97%.

Example 1

Hydrogenated Block Copolymer [D1]

A reactor equipped with a stirrer in which the internal atmosphere had been sufficiently replaced by nitrogen, was charged with 270 parts of dehydrated cyclohexane and 0.59 parts of n-dibutyl ether, and 0.66 parts of n-butyllithium (15% cyclohexane solution) was added to the mixture.

First-Step Polymerization 25.0 parts of dehydrated styrene was continuously added to the reactor over 60 minutes while stirring the mixture at 60° C. to effect a polymerization reaction. After completion of the addition, the mixture was stirred at 60° C. for 20 minutes. The polymerization conversion rate determined by subjecting the reaction mixture to gas chromatography was 99.5%.

Second-Step Polymerization

A mixture including 26.0 parts of dehydrated styrene and 24.0 parts of isoprene was continuously added to the reaction mixture over 150 minutes. After completion of the addition, the mixture was stirred for 20 minutes. The polymerization conversion rate was 99.5%.

Third-Step Polymerization 25.0 parts of dehydrated styrene was continuously added to the reaction mixture over 60 minutes. After completion of the addition, the mixture was stirred for 20 minutes. The polymerization conversion rate was about 100%.

0.5 parts of isopropyl alcohol was then added to the reaction mixture to terminate the reaction.

The resulting block copolymer [C1] had a weight average molecular weight (Mw) of 64,600 and a molecular weight distribution (Mw/Mn) of 1.03, the ratio "wA:wB" was 50:50, and the ratio "w[$I_B$]:w[$II_B$]" was 52:48.

The polymer solution was transferred to a pressure-resistant reactor equipped with a stirrer. After the addition of 7.0 parts of a nickel catalyst supported on a diatomaceous earth carrier ("E22U" manufactured by JGC Catalysts and Chemicals Ltd., nickel content (amount of nickel supported): 60%) (hydrogenation catalyst) and 80 parts of dehydrated cyclohexane, the mixture was mixed (stirred). After replacing the atmosphere inside the reactor by hydrogen gas, hydrogen was supplied to the reactor while stirring the solution to effect a hydrogenation reaction at a temperature of 190° C. for 6 hours under a pressure of 4.5 MPa.

The resulting hydrogenated block copolymer [D1] had a weight average molecular weight (Mw) of 68,400 and a molecular weight distribution (Mw/Mn) of 1.04.

After completion of the hydrogenation reaction, the reaction mixture was filtered to remove the hydrogenation catalyst. 1.0 parts of a solution prepared by dissolving 0.1 parts of pentaerythrityl tetrakis[3-(3,5-di-t-butyl-4-hydroxyphenyl)propionate] ("SONGNOX® 1010" manufactured by KOYO Chemical Research Center) (phenol-based antioxidant) in xylene was added to the filtrate, and dissolved therein.

The solvent (cyclohexane and xylene) and other volatile components were removed from the solution at a temperature of 260° C. under a pressure of 0.001 MPa or less using a cylindrical evaporator ("Kontro" manufactured by Hitachi Ltd.). The molten polymer was continuously filtered at a temperature of 260° C. using a polymer filter (manufactured by Fuji Filter Mfg. Co., Ltd.) provided with a stainless steel sintered filter (pore size: 20 μm) connected to the evaporator, extruded from a die in the shape of a strand, cooled, and cut using a pelletizer to obtain 95 parts of pellets of the hydrogenated block copolymer [D1]. The pellets of the hydrogenated block copolymer [D1] had a weight average molecular weight (Mw) of 67,700 and a molecular weight distribution (Mw/Mn) of 1.05, and the hydrogenation rate was about 100%.

The hydrogenated block copolymer [D1] (formed article) was colorless and transparent, and had a glass transition temperature $Tg_1$ of 20° C., a glass transition temperature $Tg_2$ of 140° C., and a softening temperature Ts of 136° C. (i.e., a softening temperature Ts lower than the glass transition temperature $Tg_2$ by 4° C.). The results are listed in Table 1.

Comparative Example 1

Hydrogenated Block Copolymer [D2]

A polymerization reaction was effected and terminated in the same manner as in Example 1, except that the mixture including styrene and isoprene was continuously added to the reaction solution over 25 minutes during second-step polymerization. The resulting block copolymer [C2] had a weight average molecular weight (Mw) of 64,800 and a molecular weight distribution (Mw/Mn) of 1.03, the ratio "wA:wB" was 50:50, and the ratio "w[$I_B$]:w[$II_B$]" was 52:48.

The polymer solution was subjected to a hydrogenation reaction in the same manner as in Example 1. After the addition of the antioxidant, the mixture was concentrated and dried to obtain 94 parts of pellets of a hydrogenated block copolymer [D2]. The pellets of the hydrogenated block copolymer [D2] had a weight average molecular weight (Mw) of 67,900 and a molecular weight distribution (Mw/Mn) of 1.05, and the hydrogenation rate was about 100%.

The hydrogenated block copolymer [D2] (formed article) was colorless and transparent, and had a glass transition temperature $Tg_1$ of −30° C., a glass transition temperature $Tg_2$ of 140° C., and a softening temperature Ts of 135° C. (i.e., a softening temperature Ts lower than the glass transition temperature $Tg_2$ by 5° C.). The results are listed in Table 1.

Comparative Example 2

Hydrogenated Block Copolymer [D3]

A polymerization reaction was effected and terminated in the same manner as in Example 1, except that n-butyllithium (15% cyclohexane solution) was used in a ratio of 0.82 parts. The resulting block copolymer [C3] had a weight average molecular weight (Mw) of 52,000 and a molecular weight distribution (Mw/Mn) of 1.03, the ratio "wA:wB" was 50:50, and the ratio "w[$I_B$]:w[$II_B$]" was 52:48.

The polymer solution was subjected to a hydrogenation reaction in the same manner as in Example 1. After the addition of the antioxidant, the mixture was concentrated and dried to obtain 93 parts of pellets of a hydrogenated block copolymer [D3]. The pellets of the hydrogenated block copolymer [D3] had a weight average molecular weight (Mw) of 54,500 and a molecular weight distribution (Mw/Mn) of 1.05, and the hydrogenation rate was about 100%.

The hydrogenated block copolymer [D3] (formed article) was colorless and transparent, and had a glass transition temperature $Tg_1$ of 18° C., a glass transition temperature $Tg_2$ of 132° C., and a softening temperature Ts of 127° C. (i.e., a softening temperature Ts lower than the glass transition temperature $Tg_2$ by 5° C.). The results are listed in Table 1.

Example 2

Hydrogenated Block Copolymer [D4]

A polymerization reaction was effected and terminated in the same manner as in Example 1, except that n-butyllithium (15% cyclohexane solution) was used in a ratio of 0.65 parts, and 25.0 parts of styrene, a mixture including 22.0 parts of styrene and 28.0 parts of isoprene, and 25.0 parts of styrene were added to the reaction system in this order. The resulting block copolymer [C4] had a weight average molecular weight (Mw) of 65,200 and a molecular weight distribution (Mw/Mn) of 1.03, the ratio "wA:wB" was 50:50, and the ratio "w[$I_B$]:w[$II_B$]" was 44:56.

The polymer solution was subjected to a hydrogenation reaction in the same manner as in Example 1. After the addition of the antioxidant, the mixture was concentrated and dried to obtain 96 parts of pellets of a hydrogenated block copolymer [D4]. The pellets of the hydrogenated block copolymer [D4] had a weight average molecular weight (Mw) of 68,400 and a molecular weight distribution (Mw/Mn) of 1.05, and the hydrogenation rate was about 100%.

The hydrogenated block copolymer [D4] (formed article) was colorless and transparent, and had a glass transition temperature $Tg_1$ of 7° C., a glass transition temperature $Tg_2$ of 139° C., and a softening temperature Ts of 135° C. (i.e., a softening temperature Ts lower than the glass transition temperature $Tg_2$ by 4° C.). The results are listed in Table 1.

Comparative Example 3

Hydrogenated Block Copolymer [D5]

A polymerization reaction was effected and terminated in the same manner as in Example 2, except that the mixture including styrene and isoprene was continuously added to the reaction solution over 25 minutes during second-step polymerization. The resulting block copolymer [C5] had a weight average molecular weight (Mw) of 62,300 and a molecular weight distribution (Mw/Mn) of 1.03, the ratio "wA:wB" was 50:50, and the ratio "w[$I_B$]:w[$II_B$]" was 44:56.

The polymer solution was subjected to a hydrogenation reaction in the same manner as in Example 1. After the addition of the antioxidant, the mixture was concentrated and dried to obtain 91 parts of pellets of a hydrogenated block copolymer [D5]. The pellets of the hydrogenated block copolymer [D5] had a weight average molecular weight (Mw) of 68,800 and a molecular weight distribution (Mw/Mn) of 1.05, and the hydrogenation rate was about 100%.

The hydrogenated block copolymer [D5] (formed article) was colorless and transparent, and had a glass transition temperature $Tg_1$ of −33° C., a glass transition temperature $Tg_2$ of 140° C., and a softening temperature Ts of 135° C. (i.e., a softening temperature Ts lower than the glass transition temperature $Tg_2$ by 5° C.). The results are listed in Table 1.

Comparative Example 4

Hydrogenated Block Copolymer [D6]

A polymerization reaction was effected and terminated in the same manner as in Example 1, except that 25.0 parts of styrene, a mixture including 30.0 parts of styrene and 20.0 parts of isoprene, and 25.0 parts of styrene were added to the reaction system in this order. The resulting block copolymer [C6] had a weight average molecular weight (Mw) of 64,900 and a molecular weight distribution (Mw/Mn) of 1.03, the ratio "wA:wB" was 50:50, and the ratio "w[$I_B$]:w[$II_B$]" was 60:40.

The polymer solution was subjected to a hydrogenation reaction in the same manner as in Example 1. After the addition of the antioxidant, the mixture was concentrated and dried to obtain 95 parts of pellets of a hydrogenated block copolymer [D6]. The pellets of the hydrogenated block copolymer [D6] had a weight average molecular weight (Mw) of 68,100 and a molecular weight distribution (Mw/Mn) of 1.05, and the hydrogenation rate was about 100%.

The hydrogenated block copolymer [D6] (formed article) was colorless and transparent. The glass transition temperature $Tg_1$ of the hydrogenated block copolymer [D6] was unclear (could not be observed). The hydrogenated block copolymer [D6] had a glass transition temperature $Tg_2$ of 122° C. and a softening temperature Ts of 117° C. (i.e., a softening temperature Ts lower than the glass transition temperature $Tg_2$ by 5° C.). The results are listed in Table 1.

Comparative Example 5

Hydrogenated Block Copolymer [D7]

A polymerization reaction was effected and terminated in the same manner as in Example 1, except that 25.0 parts of styrene, a mixture including 30.0 parts of styrene and 20.0 parts of isoprene, and 25.0 parts of styrene were added to the reaction system in this order, and the mixture including styrene and isoprene was continuously added to the reaction solution over 25 minutes during second-step polymerization. The resulting block copolymer [C7] had a weight average molecular weight (Mw) of 65,100 and a molecular weight distribution (Mw/Mn) of 1.03, the ratio "wA:wB" was 50:50, and the ratio "w[$I_B$]:w[$II_B$]" was 60:40.

The polymer solution was subjected to a hydrogenation reaction in the same manner as in Example 1. After the addition of the antioxidant, the mixture was concentrated and dried to obtain 93 parts of pellets of a hydrogenated block copolymer [D7]. The pellets of the hydrogenated block copolymer [D7] had a weight average molecular weight (Mw) of 68,200 and a molecular weight distribution (Mw/Mn) of 1.05, and the hydrogenation rate was about 100%.

The hydrogenated block copolymer [D7] (formed article) was colorless and transparent, and had a glass transition temperature $Tg_1$ of −25° C., a glass transition temperature $Tg_2$ of 133° C., and a softening temperature Ts of 128° C. (i.e., a softening temperature Ts lower than the glass transition temperature $Tg_2$ by 5° C.). The results are listed in Table 1.

Comparative Example 6

Hydrogenated Block Copolymer [D8]

A polymerization reaction was effected and terminated in the same manner as in Example 1, except that 25.0 parts of styrene, a mixture including 17.0 parts of styrene and 33.0 parts of isoprene, and 25.0 parts of styrene were added to the reaction system in this order. The resulting block copolymer [C8] had a weight average molecular weight (Mw) of 63,800 and a molecular weight distribution (Mw/Mn) of 1.03, the ratio "wA:wB" was 50:50, and the ratio "w[$I_B$]:w[$II_B$]" was 34:66.

The polymer solution was subjected to a hydrogenation reaction in the same manner as in Example 1. After the addition of the antioxidant, the mixture was concentrated and dried to obtain 95 parts of pellets of a hydrogenated block copolymer [D8]. The pellets of the hydrogenated block copolymer [D8] had a weight average molecular weight (Mw) of 66,900 and a molecular weight distribution (Mw/Mn) of 1.05, and the hydrogenation rate was about 100%.

The hydrogenated block copolymer [D8] (formed article) was colorless and transparent, and had a glass transition temperature $Tg_1$ of −9° C., a glass transition temperature $Tg_2$ of 139° C., and a softening temperature Ts of 134° C. (i.e., a softening temperature Ts lower than the glass transition temperature $Tg_2$ by 5° C.). The results are listed in Table 1.

Comparative Example 7

Hydrogenated Block Copolymer [D9]

A polymerization reaction was effected and terminated in the same manner as in Example 1, except that n-butyllithium (15% cyclohexane solution) was used in a ratio of 0.65 parts, and 25.0 parts of styrene, 50.0 parts of isoprene, and 25.0 parts of styrene were added to the reaction system in this order. The resulting block copolymer [C9] had a weight average molecular weight (Mw) of 63,300 and a molecular weight distribution (Mw/Mn) of 1.03, the ratio "wA:wB" was 50:50, and the ratio "w[$I_B$]:w[$II_B$]" was 0:100.

The polymer solution was subjected to a hydrogenation reaction in the same manner as in Example 1. After the addition of the antioxidant, the mixture was concentrated and dried to obtain 92 parts of pellets of a hydrogenated block copolymer [D9]. The pellets of the hydrogenated block copolymer [D9] had a weight average molecular weight (Mw) of 66,300 and a molecular weight distribution (Mw/Mn) of 1.05, and the hydrogenation rate was about 100%.

The hydrogenated block copolymer [D9] (formed article) was colorless and transparent, and had a glass transition temperature $Tg_1$ of −50° C., a glass transition temperature $Tg_2$ of 140° C., and a softening temperature Ts of 135° C. (i.e., a softening temperature Ts lower than the glass transition temperature $Tg_2$ by 5° C.). The results are listed in Table 1.

TABLE 1

| | | | Example 1 | Comp. Example 1 | Comp. Example 2 | Example 2 | Comp. Example 3 | Comp. Example 4 | Comp. Example 5 | Comp. Example 6 | Comp. Example 7 |
|---|---|---|---|---|---|---|---|---|---|---|---|
| Block copolymer [C] | | | [C1] | [C2] | [C3] | [C4] | [C5] | [C6] | [C7] | [C8] | [C9] |
| Monomer composition | | | | | | | | | | | |
| First-step polymerization | Styrene | Weight ratio | 25 | 25 | 25 | 25 | 25 | 25 | 25 | 25 | 25 |
| Second-step polymerization | Styrene/ isoprene | | 26/24 | 26/24 | 26/24 | 22/28 | 22/28 | 30/20 | 30/20 | 17/33 | 0/50 |
| Third-step polymerization | Styrene | | 25 | 25 | 25 | 25 | 25 | 25 | 25 | 25 | 25 |
| Monomer mixture addition time during second-step polymerization | | min | 120 | 25 | 120 | 120 | 25 | 120 | 25 | 120 | 120 |
| w[A]:w[B] | | Weight ratio | 50:50 | 50:50 | 50:50 | 50:50 | 50:50 | 50:50 | 50:50 | 50:50 | 50:50 |
| w[I$_B$]:w[II$_B$] | | Weight ratio | 52:48 | 52:48 | 52:48 | 44:56 | 44:56 | 60:40 | 60:40 | 34:66 | 0:100 |
| Hydrogenated block copolymer [D] | | | [D1] | [D2] | [D3] | [D4] | [D5] | [D6] | [D7] | [D8] | [D9] |
| Weight average molecular weight (Mw) | | — | 67,700 | 67,900 | 54,500 | 68,400 | 68,800 | 68,100 | 68,200 | 66,900 | 66,300 |
| Tg$_1$ | | °C. | 20 | −30 | 18 | 7 | −33 | Unclear | −25 | −9 | −50 |
| Tg$_2$ | | °C. | 140 | 140 | 132 | 139 | 140 | 122 | 133 | 139 | 140 |
| Ts | | °C. | 136 | 135 | 127 | 135 | 135 | 117 | 128 | 134 | 135 |

Example 3

Hydrogenated Block Copolymer [D10]

A polymerization reaction was effected and terminated in the same manner as in Example 1, except that n-butyllithium (15% cyclohexane solution) was used in a ratio of 0.63 parts, and 30.0 parts of styrene, a mixture including 21.0 parts of styrene and 19.0 parts of isoprene, and 30.0 parts of styrene were added to the reaction system in this order. The resulting block copolymer [C10] had a weight average molecular weight (Mw) of 68,100 and a molecular weight distribution (Mw/Mn) of 1.03, the ratio "wA:wB" was 60:40, and the ratio "w[I$_B$]:w[II$_B$]" was 53:47.

The polymer solution was subjected to a hydrogenation reaction in the same manner as in Example 1. After the addition of the antioxidant, the mixture was concentrated and dried to obtain 91 parts of pellets of a hydrogenated block copolymer [D10]. The pellets of the hydrogenated block copolymer [D10] had a weight average molecular weight (Mw) of 71,400 and a molecular weight distribution (Mw/Mn) of 1.06, and the hydrogenation rate was about 100%.

The hydrogenated block copolymer [D10] (formed article) was colorless and transparent, and had a glass transition temperature Tg$_1$ of 21° C., a glass transition temperature Tg$_2$ of 139° C., and a softening temperature Ts of 134° C. (i.e., a softening temperature Ts lower than the glass transition temperature Tg$_2$ by 5° C.). The results are listed in Table 2.

Comparative Example 8

Hydrogenated Block Copolymer [D11]

A polymerization reaction was effected and terminated in the same manner as in Example 3, except that the mixture including styrene and isoprene was continuously added to the reaction solution over 25 minutes during second-step polymerization. The resulting block copolymer [C11] had a weight average molecular weight (Mw) of 68,400 and a molecular weight distribution (Mw/Mn) of 1.03, the ratio "wA:wB" was 60:40, and the ratio "w[I$_B$]:w[II$_B$]" was 53:47.

The polymer solution was subjected to a hydrogenation reaction in the same manner as in Example 1. After the addition of the antioxidant, the mixture was concentrated and dried to obtain 90 parts of pellets of a hydrogenated block copolymer [D11]. The pellets of the hydrogenated block copolymer [D11] had a weight average molecular weight (Mw) of 71,700 and a molecular weight distribution (Mw/Mn) of 1.05, and the hydrogenation rate was about 100%.

The hydrogenated block copolymer [D11] (formed article) was colorless and transparent, and had a glass transition temperature Tg$_1$ of −28° C., a glass transition temperature Tg$_2$ of 140° C., and a softening temperature Ts of 135° C. (i.e., a softening temperature Ts lower than the glass transition temperature Tg$_2$ by 5° C.). The results are listed in Table 2.

Comparative Example 9

Hydrogenated Block Copolymer [D12]

A polymerization reaction was effected and terminated in the same manner as in Example 3, except that n-butyllithium (15% cyclohexane solution) was used in a ratio of 0.85 parts. The resulting block copolymer [C12] had a weight average molecular weight (Mw) of 52,300 and a molecular weight distribution (Mw/Mn) of 1.03, the ratio "wA:wB" was 50:50, and the ratio "w[I$_B$]:w[II$_B$]" was 53:47.

The polymer solution was subjected to a hydrogenation reaction in the same manner as in Example 1. After the addition of the antioxidant, the mixture was concentrated and dried to obtain 91 parts of pellets of a hydrogenated block copolymer [D12]. The pellets of the hydrogenated block copolymer [D12] had a weight average molecular weight (Mw) of 54,900 and a molecular weight distribution (Mw/Mn) of 1.05, and the hydrogenation rate was about 100%.

The hydrogenated block copolymer [D12] (formed article) was colorless and transparent, and had a glass transition temperature Tg$_1$ of 19° C., a glass transition temperature Tg$_2$ of 137° C., and a softening temperature Ts of 132° C. (i.e., a softening temperature Ts lower than the glass transition temperature Tg$_2$ by 5° C.). The results are listed in Table 2.

Example 4

Hydrogenated Block Copolymer [D13]

A polymerization reaction was effected and terminated in the same manner as in Example 1, except that n-butyllithium (15% cyclohexane solution) was used in a ratio of 0.63 parts, and 30.0 parts of styrene, a mixture including 17.0 parts of styrene and 23.0 parts of isoprene, and 30.0 parts of styrene were added to the reaction system in this order. The resulting block copolymer [C13] had a weight average molecular weight (Mw) of 67,700 and a molecular weight distribution (Mw/Mn) of 1.03, the ratio "wA:wB" was 60:40, and the ratio "w[$I_B$]:w[$II_B$]" was 43:57.

The polymer solution was subjected to a hydrogenation reaction in the same manner as in Example 1. After the addition of the antioxidant, the mixture was concentrated and dried to obtain 92 parts of pellets of a hydrogenated block copolymer [D13]. The pellets of the hydrogenated block copolymer [D13] had a weight average molecular weight (Mw) of 71,100 and a molecular weight distribution (Mw/Mn) of 1.06, and the hydrogenation rate was about 100%.

The hydrogenated block copolymer [D13] (formed article) was colorless and transparent, and had a glass transition temperature $Tg_1$ of 4° C., a glass transition temperature $Tg_2$ of 140° C., and a softening temperature Ts of 135° C. (i.e., a softening temperature Ts lower than the glass transition temperature $Tg_2$ by 5° C.). The results are listed in Table 2.

Comparative Example 10

Hydrogenated Block Copolymer [D14]

A polymerization reaction was effected and terminated in the same manner as in Example 1, except that n-butyllithium (15% cyclohexane solution) was used in a ratio of 0.63 parts, and 30.0 parts of styrene, a mixture including 14.0 parts of styrene and 26.0 parts of isoprene, and 30.0 parts of styrene were added to the reaction system in this order. The resulting block copolymer [C14] had a weight average molecular weight (Mw) of 67,500 and a molecular weight distribution (Mw/Mn) of 1.03, the ratio "wA:wB" was 60:40, and the ratio "w[$I_B$]:w[$II_B$]" was 35:65.

The polymer solution was subjected to a hydrogenation reaction in the same manner as in Example 1. After the addition of the antioxidant, the mixture was concentrated and dried to obtain 94 parts of pellets of a hydrogenated block copolymer [D14]. The pellets of the hydrogenated block copolymer [D14] had a weight average molecular weight (Mw) of 70,800 and a molecular weight distribution (Mw/Mn) of 1.06, and the hydrogenation rate was about 100%.

The hydrogenated block copolymer [D14] (formed article) was colorless and transparent, and had a glass transition temperature $Tg_1$ of −7° C., a glass transition temperature $Tg_2$ of 139° C., and a softening temperature Ts of 134° C. (i.e., a softening temperature Ts lower than the glass transition temperature $Tg_2$ by 5° C.). The results are listed in Table 2.

Comparative Example 11

Hydrogenated Block Copolymer [D15]

A polymerization reaction was effected and terminated in the same manner as in Example 1, except that n-butyllithium (15% cyclohexane solution) was used in a ratio of 0.63 parts, and 30.0 parts of styrene, 40.0 parts of isoprene, and 30.0 parts of styrene were added to the reaction system in this order. The resulting block copolymer [C15] had a weight average molecular weight (Mw) of 66,200 and a molecular weight distribution (Mw/Mn) of 1.03, the ratio "wA:wB" was 60:40, and the ratio "w[$I_B$]:w[$II_B$]" was 0:100.

The polymer solution was subjected to a hydrogenation reaction in the same manner as in Example 1. After the addition of the antioxidant, the mixture was concentrated and dried to obtain 97 parts of pellets of a hydrogenated block copolymer [D15]. The pellets of the hydrogenated block copolymer [D15] had a weight average molecular weight (Mw) of 69,400 and a molecular weight distribution (Mw/Mn) of 1.05, and the hydrogenation rate was about 100%.

The hydrogenated block copolymer [D15] (formed article) was colorless and transparent, and had a glass transition temperature $Tg_1$ of −50° C., a glass transition temperature $Tg_2$ of 140° C., and a softening temperature Ts of 135° C. (i.e., a softening temperature Ts lower than the glass transition temperature $Tg_2$ by 5° C.). The results are listed in Table 2.

Comparative Example 12

Hydrogenated Block Copolymer [D16]

A polymerization reaction was effected and terminated in the same manner as in Example 1, except that n-butyllithium (15% cyclohexane solution) was used in a ratio of 0.63 parts, and 30.0 parts of styrene, a mixture including 24.0 parts of styrene and 16.0 parts of isoprene, and 30.0 parts of styrene were added to the reaction system in this order. The resulting block copolymer [C16] had a weight average molecular weight (Mw) of 68,400 and a molecular weight distribution (Mw/Mn) of 1.03, the ratio "wA:wB" was 60:40, and the ratio "w[$I_B$]:w[$II_B$]" was 60:40.

The polymer solution was subjected to a hydrogenation reaction in the same manner as in Example 1. After the addition of the antioxidant, the mixture was concentrated and dried to obtain 91 parts of pellets of a hydrogenated block copolymer [D16]. The pellets of the hydrogenated block copolymer [D16] had a weight average molecular weight (Mw) of 71,700 and a molecular weight distribution (Mw/Mn) of 1.06, and the hydrogenation rate was about 100%.

The hydrogenated block copolymer [D16] (formed article) was colorless and transparent. The glass transition temperature $Tg_1$ of the hydrogenated block copolymer [D16] was unclear (could not be observed). The hydrogenated block copolymer [D16] had a glass transition temperature $Tg_2$ of 124° C. and a softening temperature Ts of 119° C. (i.e., a softening temperature Ts lower than the glass transition temperature $Tg_2$ by 5° C.). The results are listed in Table 2.

Comparative Example 13

Hydrogenated Block Copolymer [D17]

A polymerization reaction was effected and terminated in the same manner as in Example 1, except that n-butyllithium (15% cyclohexane solution) was used in a ratio of 0.63 parts, and 40.0 parts of styrene, a mixture including 3.0 parts of styrene and 15.0 parts of isoprene, and 42.0 parts of styrene were added to the reaction system in this order. The resulting block copolymer [C17] had a weight average molecular weight (Mw) of 68,500 and a molecular weight distribution (Mw/Mn) of 1.03, the ratio "wA:wB" was 82:18, and the ratio "w[$I_B$]:w[$II_B$]" was 17:83.

The polymer solution was subjected to a hydrogenation reaction in the same manner as in Example 1. After the addition of the antioxidant, the mixture was concentrated and dried to obtain 95 parts of pellets of a hydrogenated block copolymer [D17]. The pellets of the hydrogenated block copolymer [D17] had a weight average molecular weight (Mw) of 71,800 and a molecular weight distribution (Mw/Mn) of 1.06, and the hydrogenation rate was about 100%.

The hydrogenated block copolymer [D17] (formed article) was colorless and transparent, and had a glass transition temperature $Tg_1$ of −31° C., a glass transition temperature $Tg_2$ of 133° C., and a softening temperature Ts of 128° C. (i.e., a softening temperature Ts lower than the glass transition temperature $Tg_2$ by 5° C.). The results are listed in Table 2.

Comparative Example 14

Hydrogenated Block Copolymer [D18]

A polymerization reaction was effected and terminated in the same manner as in Example 1, except that n-butyllithium (15% cyclohexane solution) was used in a ratio of 0.63 parts, and 35.0 parts of styrene, a mixture including 15.0 parts of styrene and 15.0 parts of isoprene, and 35.0 parts of styrene were added to the reaction system in this order. The resulting block copolymer [C18] had a weight average molecular weight (Mw) of 68,400 and a molecular weight distribution (Mw/Mn) of 1.03, the ratio "wA:wB" was 70:30, and the ratio "w[$I_B$]:w[$II_B$]" was 40:60.

The polymer solution was subjected to a hydrogenation reaction in the same manner as in Example 1. After the addition of the antioxidant, the mixture was concentrated and dried to obtain 91 parts of pellets of a hydrogenated block copolymer [D18]. The pellets of the hydrogenated block copolymer [D18] had a weight average molecular weight (Mw) of 71,800 and a molecular weight distribution (Mw/Mn) of 1.06, and the hydrogenation rate was about 100%.

The hydrogenated block copolymer [D18] (formed article) was colorless and transparent. The glass transition temperature $Tg_1$ of the hydrogenated block copolymer [D18] was unclear (could not be observed). The hydrogenated block copolymer [D18] had a glass transition temperature $Tg_2$ of 120° C. and a softening temperature Ts of 116° C. (i.e., a softening temperature Ts lower than the glass transition temperature $Tg_2$ by 4° C.). The results are listed in Table 2.

Comparative Example 15

Hydrogenated Block Copolymer [D19]

A polymerization reaction was effected and terminated in the same manner as in Example 1, except that n-butyllithium (15% cyclohexane solution) was used in a ratio of 0.63 parts, and 20.0 parts of styrene, a mixture including 30.0 parts of styrene and 30.0 parts of isoprene, and 20.0 parts of styrene were added to the reaction system in this order. The resulting block copolymer [C19] had a weight average molecular weight (Mw) of 67,100 and a molecular weight distribution (Mw/Mn) of 1.03, the ratio "wA:wB" was 40:60, and the ratio "w[$I_B$]:w[$II_B$]" was 50:50.

The polymer solution was subjected to a hydrogenation reaction in the same manner as in Example 1. After the addition of the antioxidant, the mixture was concentrated and dried to obtain 91 parts of pellets of a hydrogenated block copolymer [D19]. The pellets of the hydrogenated block copolymer [D19] had a weight average molecular weight (Mw) of 70,400 and a molecular weight distribution (Mw/Mn) of 1.06, and the hydrogenation rate was about 100%.

The hydrogenated block copolymer [D19] (formed article) was colorless and transparent. The glass transition temperature $Tg_1$ of the hydrogenated block copolymer [D19] was unclear (could not be observed). The hydrogenated block copolymer [D19] had a glass transition temperature $Tg_2$ of 115° C. and a softening temperature Ts of 110° C. (i.e., a softening temperature Ts lower than the glass transition temperature $Tg_2$ by 5° C.). The results are listed in Table 2.

TABLE 2

|  |  |  | Example 3 | Comp. Example 8 | Comp. Example 9 | Example 4 | Comp. Example 10 |
|---|---|---|---|---|---|---|---|
| Block copolymer [C] |  |  | [C10] | [C11] | [C12] | [C13] | [C14] |
| Monomer composition |  |  |  |  |  |  |  |
| First-step polymerization | Styrene | Weight ratio | 30 | 30 | 30 | 30 | 30 |
| Second-step polymerization | Styrene/ isoprene |  | 21/19 | 21/19 | 21/19 | 17/23 | 14/26 |
| Third-step polymerization | Styrene |  | 30 | 30 | 30 | 30 | 30 |
| Monomer mixture addition time during second-step polymerization | min |  | 120 | 25 | 120 | 120 | 120 |
| w[A]:w[B] | Weight ratio |  | 60:40 | 60:40 | 60:40 | 60:40 | 60:40 |
| w[$I_B$]:w[$II_B$] | Weight ratio |  | 53:47 | 53:47 | 53:47 | 43:57 | 35:65 |
| Hydrogenated block copolymer [D] |  |  | [D10] | [D11] | [D12] | [D13] | [D14] |
| Weight average molecular weight (Mw) | — |  |  | 71,400 | 71,700 | 54,900 | 71,100 | 70,800 |
| $Tg_1$ | ° C. |  | 21 | −28 | 19 | 4 | −7 |
| $Tg_2$ | ° C. |  | 139 | 140 | 137 | 140 | 139 |
| Ts | ° C. |  | 134 | 135 | 132 | 135 | 134 |

TABLE 2-continued

|  |  |  | Comp. Example 11 | Comp. Example 12 | Comp. Example 13 | Comp. Example 14 | Comp. Example 15 |
|---|---|---|---|---|---|---|---|
| Block copolymer [C] |  |  | [C15] | [C16] | [C17] | [C18] | [C19] |
| Monomer composition |  |  |  |  |  |  |  |
| First-step polymerization | Styrene | Weight ratio | 30 | 30 | 40 | 35 | 20 |
| Second-step polymerization | Styrene/ isoprene |  | 0/40 | 24/16 | 3/15 | 15/15 | 30/30 |
| Third-step polymerization | Styrene |  | 30 | 30 | 42 | 35 | 20 |
| Monomer mixture addition time during second-step polymerization |  | min | 120 | 120 | 120 | 120 | 120 |
| w[A]:w[B] |  | Weight ratio | 60:40 | 60:40 | 82:18 | 70:30 | 40:60 |
| w[$I_B$]:w[$II_B$] |  | Weight ratio | 0:100 | 60:40 | 17:83 | 50:50 | 50:50 |
| Hydrogenated block copolymer [D] |  |  | [D15] | [D16] | [D17] | [D18] | [D19] |
| Weight average molecular weight (Mw) |  |  | — | 69,400 | 71,700 | 71,800 | 70,400 |
| $Tg_1$ |  | ° C. | −50 | Unclear | −31 | Unclear | Unclear |
| $Tg_2$ |  | ° C. | 140 | 124 | 133 | 120 | 115 |
| Ts |  | ° C. | 135 | 119 | 128 | 116 | 110 |

Comparative Example 16

Hydrogenated Block Copolymer [D20]

A polymerization reaction was effected and terminated in the same manner as in Example 1, except that 26.0 parts of styrene, 12.0 parts of isoprene, 25.0 parts of styrene, 12.0 parts of isoprene, and 25.0 parts of styrene were added to the reaction system in this order (styrene was continuously added to the reaction mixture over 60 minutes, isoprene was continuously added to the reaction mixture over 30 minutes, and the reaction mixture was stirred for 20 minutes after the addition of styrene or isoprene). The resulting block copolymer [C20] was a pentablock polymer, and had a weight average molecular weight (Mw) of 62,700 and a molecular weight distribution (Mw/Mn) of 1.03, the ratio "wA:wB" was 76:24, and the ratio "w[$I_B$]:w[$II_B$]" was 0:100.

The polymer solution was subjected to a hydrogenation reaction in the same manner as in Example 1. After the addition of the antioxidant, the mixture was concentrated and dried to obtain 94 parts of pellets of a hydrogenated block copolymer [D20]. The pellets of the hydrogenated block copolymer [D20] had a weight average molecular weight (Mw) of 65,700 and a molecular weight distribution (Mw/Mn) of 1.05, and the hydrogenation rate was about 100%.

The glass transition temperature $Tg_1$ of the hydrogenated block copolymer [D20] (formed article) was unclear (could not be observed). The hydrogenated block copolymer [D20] had a glass transition temperature $Tg_2$ of 116° C. and a softening temperature Ts of 112° C. (i.e., a softening temperature Ts lower than the glass transition temperature $Tg_2$ by 4° C.).

Example 5

Stretched Film [F1]

The pellets of the hydrogenated block copolymer [D1] obtained in Example 1 were heated at 70° C. for 4 hours using a hot-air dryer in which air was circulated. The pellets of the hydrogenated block copolymer [D1] from which dissolved air had been removed by heating, were extruded using a T-die film melt extruder (width of T-die: 300 mm) (provided with a twin-screw kneader having a screw with a diameter of 37 mm), and an extruded film-forming device provided with a casting roll and a film take-up device (molten resin temperature: 220° C., T-die temperature: 220° C., casting roll temperature: 80° C.), and cooled without being stretched to obtain an unstretched film [E1] (thickness: 100 μm, width: 230 mm) formed of the modified hydrogenated block copolymer [D1]. The unstretched film [E1] was wound around a roll in a state in which a PET film (thickness: 25 μm) was stacked thereon. The in-plane retardation (Re) of the unstretched film [E1] was 9 nm.

The unstretched film [E1] (that had been wound around a roll) was fed to a uniaxial stretching machine (that effects uniaxial stretching by utilizing the difference in circumferential speed between rolls) installed in a clean room, heated to 150° C. ($Tg_2$+10° C.) using a heating roll, and uniaxially stretched (stretching ratio in extrusion direction: 2.0, stretching speed (tensile speed): 40 mm/sec) while being sequentially passed through a first roll and a second roll that differed in rotational speed to obtain a stretched film [F1]. The stretched film was cooled to 35° C. using a cooling roll, and wound up. The stretched film [F1] had a thickness of 61 μm. The in-plane retardation(Re°) of the stretched film [F1] was 182 nm.

The stretched film [F1] was stored at 80° C. for 100 hours to evaluate the heat resistance. The in-plane retardation (Re) after storage was 178 nm, and the retardation retention ratio was 98%. The heat resistance of the stretched film was thus evaluated as "Good". The results are listed in Table 3.

Example 6

Stretched Film [F4]

An unstretched film [E4] (thickness: 100 μm, width: 230 mm) formed of the hydrogenated block copolymer [D4] was produced in the same manner as in Example 5, except that the pellets of the hydrogenated block copolymer [D4]

obtained in Example 2 were used. The in-plane retardation (Re) of the unstretched film [E4] was 9 nm.

A stretched film [F4] was produced by stretching the unstretched film [E4] using the same device as that used in Example 5, and the heat resistance of the stretched film [F4] was evaluated. The stretching conditions and the evaluation results are listed in Table 3.

Example 7

Stretched Film [F10]

An unstretched film [E10] (thickness: 100 μm, width: 230 mm) formed of the hydrogenated block copolymer [D10] was produced in the same manner as in Example 5, except that the pellets of the hydrogenated block copolymer [D10] obtained in Example 3 were used. The in-plane retardation (Re) of the unstretched film [E10] was 6 nm.

A stretched film [F10] was produced by stretching the unstretched film [E10] using the same device as that used in Example 5, and the heat resistance of the stretched film [F10] was evaluated. The stretching conditions and the evaluation results are listed in Table 3.

Example 8

Stretched Film [F13]

An unstretched film [E13] (thickness: 100 μm, width: 230 mm) formed of the hydrogenated block copolymer [D13] was produced in the same manner as in Example 5, except that the pellets of the hydrogenated block copolymer [D13] obtained in Example 4 were used. The in-plane retardation (Re) of the unstretched film [E13] was 9 nm.

A stretched film [F13] was produced by stretching the unstretched film [E13] using the same device as that used in Example 5, and the heat resistance of the stretched film [F13] was evaluated. The stretching conditions and the evaluation results are listed in Table 3.

Comparative Example 16

Stretched Film [F2]

An unstretched film [E2] (thickness: 100 μm, width: 230 mm) formed of the hydrogenated block copolymer [D2] was produced in the same manner as in Example 5, except that the pellets of the hydrogenated block copolymer [D2] obtained in Comparative Example 1 were used. The in-plane retardation (Re) of the unstretched film [E2] was 8 nm.

A stretched film [F2] was produced by stretching the unstretched film [E2] using the same device as that used in Example 5, and the heat resistance of the stretched film [F2] was evaluated. The stretching conditions and the evaluation results are listed in Table 3.

Comparative Example 17

Stretched Film [F3]

An unstretched film [E3] (thickness: 100 μm, width: 230 mm) formed of the hydrogenated block copolymer [D3] was produced in the same manner as in Example 5, except that the pellets of the hydrogenated block copolymer [D3] obtained in Comparative Example 2 were used. The in-plane retardation (Re) of the unstretched film [E3] was 8 nm.

A stretched film [F3] was produced by stretching the unstretched film [E3] using the same device as that used in Example 5, and the heat resistance of the stretched film [F3] was evaluated. The stretching conditions and the evaluation results are listed in Table 3.

Comparative Example 18

Stretched Film [F6]

An unstretched film [E6] (thickness: 100 μm, width: 230 mm) formed of the hydrogenated block copolymer [D6] was produced in the same manner as in Example 5, except that the pellets of the hydrogenated block copolymer [D6] obtained in Comparative Example 4 were used. The in-plane retardation (Re) of the unstretched film [E6] was 6 nm.

A stretched film [F6] was produced by stretching the unstretched film [E6] using the same device as that used in Example 5, and the heat resistance of the stretched film [F6] was evaluated. The stretching conditions and the evaluation results are listed in Table 3.

Comparative Example 19

Stretched Film [F7]

An unstretched film [E7] (thickness: 100 μm, width: 230 mm) formed of the hydrogenated block copolymer [D7] was produced in the same manner as in Example 5, except that the pellets of the hydrogenated block copolymer [D7] obtained in Comparative Example 5 were used. The in-plane retardation (Re) of the unstretched film [E7] was 7 nm.

A stretched film [F7] was produced by stretching the unstretched film [E7] using the same device as that used in Example 5, and the heat resistance of the stretched film [F7] was evaluated. The stretching conditions and the evaluation results are listed in Table 3.

Comparative Example 20

Stretched Film [F8]

An unstretched film [E8] (thickness: 100 μm, width: 230 mm) formed of the hydrogenated block copolymer [D8] was produced in the same manner as in Example 5, except that the pellets of the hydrogenated block copolymer [D8] obtained in Comparative Example 6 were used. The in-plane retardation (Re) of the unstretched film [E8] was 9 nm.

A stretched film [F8] was produced by stretching the unstretched film [E8] using the same device as that used in Example 5, and the heat resistance of the stretched film [F8] was evaluated. The stretching conditions and the evaluation results are listed in Table 3.

Comparative Example 21

Stretched Film [F9]

An unstretched film [E9] (thickness: 100 μm, width: 230 mm) formed of the hydrogenated block copolymer [D9] was produced in the same manner as in Example 5, except that the pellets of the hydrogenated block copolymer [D9] obtained in Comparative Example 7 were used. The in-plane retardation (Re) of the unstretched film [E9] was 10 nm.

A stretched film [F9] was produced by stretching the unstretched film [E9] using the same device as that used in Example 5, and the heat resistance of the stretched film [F9] was evaluated. The stretching conditions and the evaluation results are listed in Table 3.

TABLE 3

| | | Example 5 | Example 6 | Example 7 | Example 8 | Comp. Example 16 | Comp. Example 17 | Comp. Example 18 | Comp. Example 19 | Comp. Example 20 | Comp. Example 21 |
|---|---|---|---|---|---|---|---|---|---|---|---|
| Hydrogenated block copolymer [D] | | [D1] | [D4] | [D10] | [D13] | [D2] | [D3] | [D6] | [D7] | [D8] | [D9] |
| w[A]:w[B] | Weight ratio | 50:50 | 50:50 | 60:40 | 60:40 | 50:50 | 50:50 | 50:50 | 50:50 | 50:50 | 50:50 |
| w[$I_B$]:w[$II_B$] | Weight ratio | 52:48 | 44:56 | 53:47 | 43:57 | 52:48 | 52:48 | 60:40 | 60:40 | 34:66 | 0:100 |
| Weight average molecular weight ($M_w$) | — | 65,700 | 68,400 | 71,400 | 71,100 | 67,900 | 54,500 | 68,100 | 68,200 | 66,900 | 66,300 |
| $Tg_1$ | °C. | 20 | 7 | 21 | 4 | −30 | 18 | Unclear | −25 | −9 | −50 |
| $Tg_2$ | °C. | 140 | 139 | 139 | 140 | 140 | 132 | 122 | 133 | 139 | 140 |
| Stretched film [F] | | [F1] | [F4] | [F10] | [F13] | [F2] | [F3] | [F6] | [F7] | [F8] | [F9] |
| Stretching temperature (°C.) | °C. | 150 | 150 | 150 | 150 | 150 | 142 | 132 | 143 | 150 | 150 |
| Stretching temperature-$Tg_2$ | °C. | 10 | 11 | 11 | 10 | 10 | 10 | 10 | 10 | 11 | 10 |
| Stretching ratio | — | 2.0 | 2.0 | 2.0 | 2.0 | 2.0 | 2.0 | 2.0 | 2.0 | 2.0 | 2.0 |
| Thickness of stretched film [F] | μm | 61 | 64 | 63 | 66 | 65 | 66 | 68 | 62 | 58 | 57 |
| Retardation (Re) of stretched film [F] | nm | 182 | 222 | 148 | 188 | 197 | 185 | 169 | 154 | 237 | 353 |
| Retardation (Re) after storage at 80° C. for 100 h | nm | 178 | 216 | 145 | 183 | 178 | 133 | 111 | 126 | 180 | 155 |
| Retardation retention ratio | % | 98 | 97 | 98 | 97 | 90 | 72 | 66 | 82 | 76 | 44 |
| Evaluation of heat resistance | — | Good | Good | Good | Good | Bad | Bad | Bad | Bad | Bad | Bad |

Comparative Example 22

Stretched Film [F12]

An unstretched film [E12] (thickness: 100 μm, width: 230 mm) formed of the hydrogenated block copolymer [D12] was produced in the same manner as in Example 5, except that the pellets of the hydrogenated block copolymer [D12] obtained in Comparative Example 9 were used. The in-plane retardation (Re) of the unstretched film [E12] was 7 nm.

When the unstretched film [E12] was stretched using the same device as that used in Example 5, the unstretched film [E12] broke during stretching due to poor mechanical strength, and a good stretched film could not be obtained.

The following were confirmed from the results obtained in the examples and the comparative examples.

When the ratio (wA:wB) of the total weight fraction wA of the polymer blocks [A] in the block copolymer [C] to the weight fraction wB of the polymer block [B] in the block copolymer [C] was 45:55 to 65:35, and the ratio (w[$I_B$]:w[$II_B$]) of the weight fraction w[$I_B$] of the repeating unit [I] derived from an aromatic vinyl compound in the polymer block [B] to the weight fraction w[$II_B$] of the repeating unit [II] derived from a linear conjugated diene compound in the polymer block [B] was 40:60 to 55:45, a hydrogenated block copolymer [D] having a low-temperature-side glass transition temperature [$Tg_1$] of 0° C. or more could be obtained (Examples 1 to 4).

Even when the ratio (wA:wB) of the total weight fraction wA of the polymer blocks [A] in the block copolymer [C] to the weight fraction wB of the polymer block [B] in the block copolymer [C] was 45:55 to 65:35, and the ratio (w[$I_B$]:w[$II_B$]) of the weight fraction w[$I_B$] of the repeating unit [I] derived from an aromatic vinyl compound in the polymer block [B] to the weight fraction w[$II_B$] of the repeating unit [II] derived from a linear conjugated diene compound in the polymer block [B] was 40:60 to 55:45, a hydrogenated block copolymer [D] having a low-temperature-side glass transition temperature [$Tg_1$] of less than 0° C. was obtained when the monomer mixture was too quickly supplied to the polymer solution when subjecting a mixture including an aromatic vinyl compound and a linear conjugated diene compound to copolymerization to form the polymer block [B] (Comparative Examples 2, 3, and 8).

When the ratio (wA:wB) of the total weight fraction wA of the polymer blocks [A] in the block copolymer [C] to the weight fraction wB of the polymer block [B] in the block copolymer [C] was 45:55 to 65:35, the ratio (w[$I_B$]:w[$II_B$]) of the weight fraction w[$I_B$] of the repeating unit [I] derived from an aromatic vinyl compound in the polymer block [B] to the weight fraction w[$II_B$] of the repeating unit [II] derived from a linear conjugated diene compound in the polymer block [B] was 40:60 to 55:45, and the weight average molecular weight (Mw) of the hydrogenated block copolymer [D] was 60,000 or more, a hydrogenated block copolymer [D] having a high-temperature-side glass transition temperature [$Tg_2$] of 135° C. or more could be obtained (Examples 1 to 4).

Even when the ratio (wA:wB) of the total weight fraction wA of the polymer blocks [A] in the block copolymer [C] to the weight fraction wB of the polymer block [B] in the block copolymer [C] was 45:55 to 65:35, and the ratio (w[$I_B$]:w[$II_B$]) of the weight fraction w[$I_B$] of the repeating unit [I] derived from an aromatic vinyl compound in the polymer block [B] to the weight fraction w[$II_B$] of the repeating unit [II] derived from a linear conjugated diene compound in the polymer block [B] was 40:60 to 55:45, the high-temperature-side glass transition temperature [$Tg_2$] was less than 135° C. (Comparative Example 2), or the high-temperature-side glass transition temperature [$Tg_2$] was more than 135° C., but the film could not be stretched due to low mechanical strength (Comparative Example 22), when the weight average molecular weight (Mw) of the hydrogenated block copolymer [D] was less than 60,000.

Even when the ratio (w[$I_B$]:w[$II_B$]) of the weight fraction w[$I_B$] of the repeating unit [I] derived from an aromatic vinyl compound in the polymer block [B] to the weight fraction w[$II_B$] of the repeating unit [II] derived from a linear conjugated diene compound in the polymer block [B] was 40:60 to 55:45, the low-temperature-side glass transition temperature [$Tg_1$] was unclear, and the high-temperature-side glass transition temperature [$Tg_2$] was less than 135° C. when the ratio (wA:wB) of the total weight fraction wA of the polymer blocks [A] in the block copolymer [C] to the weight fraction wB of the polymer block [B] in the block copolymer [C] was less than 45:55 (Comparative Example 15), or when the ratio (wA:wB) of the total weight fraction wA of the polymer blocks [A] in the block copolymer [C] to the weight fraction wB of the polymer block [B] in the block copolymer [C] was more than 65:35 (Comparative Example 14).

Even when the ratio (wA:wB) of the total weight fraction wA of the polymer blocks [A] in the block copolymer [C] to the weight fraction wB of the polymer block [B] in the block copolymer [C] was 45:55 to 65:35, the low-temperature-side glass transition temperature [$Tg_1$] was less than 0° C. when the ratio (w[$I_B$]:w[$II_B$]) of the weight fraction w[$I_B$] of the repeating unit [I] derived from an aromatic vinyl compound in the polymer block [B] to the weight fraction w[$II_B$] of the repeating unit [II] derived from a linear conjugated diene compound in the polymer block [B] was less than 40:60 (Comparative Examples 6 and 7).

Even when the ratio (wA:wB) of the total weight fraction wA of the polymer blocks [A] in the block copolymer [C] to the weight fraction wB of the polymer block [B] in the block copolymer [C] was 45:55 to 65:35, the low-temperature-side glass transition temperature [$Tg_1$] was unclear, and the high-temperature-side glass transition temperature [$Tg_2$] was less than 135° C. when the ratio (w[$I_B$]:w[$II_B$]) of the weight fraction w[$I_B$] of the repeating unit [I] derived from an aromatic vinyl compound in the polymer block [B] to the weight fraction w[$II_B$] of the repeating unit [II] derived from a linear conjugated diene compound in the polymer block [B] was more than 55:45 (Comparative Examples 4 and 12).

Even when the ratio (wA:wB) of the total weight fraction wA of the polymer blocks [A] in the block copolymer [C] to the weight fraction wB of the polymer block [B] in the block copolymer [C] was 45:55 to 65:35, the low-temperature-side glass transition temperature [$Tg_1$] was less than 0°, and the high-temperature-side glass transition temperature [$Tg_2$] was less than 135° C. when the ratio (w[$I_B$]:w[$II_B$]) of the weight fraction w[$I_B$] of the repeating unit [I] derived from an aromatic vinyl compound in the polymer block [B] to the weight fraction w[$II_B$] of the repeating unit [III] derived from a linear conjugated diene compound in the polymer block [B] was more than 55:45, and the monomer mixture was too quickly supplied to the polymer solution when forming the polymer block [B] (Comparative Example 5).

The stretched film including the hydrogenated block copolymer [D] having a low-temperature-side glass transition temperature [$Tg_1$] of 0° C. or more and a high-temperature-side glass transition temperature [$Tg_2$] of 135° C. or more, had a high retardation retention ratio when stored at 80° C. for 100 hours, and exhibited excellent heat resistance (Examples 5 to 8).

The stretched film including the hydrogenated block copolymer [D] having a high-temperature-side glass transition temperature [$Tg_2$] of 135° C. or more and a low-temperature-side glass transition temperature [$Tg_1$] of less than 0° C., had a low retardation retention ratio when stored at 80° C. for 100 hours, and exhibited poor heat resistance (Comparative Examples 16, 20, and 21).

The stretched film including the hydrogenated block copolymer [D] having a low-temperature-side glass transition temperature [$Tg_1$] of 0° C. or more and a high-temperature-side glass transition temperature [$Tg_2$] of less than 135° C., had a low retardation retention ratio when stored at 80° C. for 100 hours, and exhibited poor heat resistance (Comparative Example 17).

The stretched film including the hydrogenated block copolymer [D] having an unclear low-temperature-side glass transition temperature [$Tg_1$] and a high-temperature-side glass transition temperature [$Tg_2$] of less than 135° C., and the stretched film including the hydrogenated block copolymer [D] having a low-temperature-side glass transition temperature [$Tg_1$] of less than 0° C. and a high-temperature-side glass transition temperature [$Tg_2$] of less than 135° C., had a low retardation retention ratio when stored at 80° C. for 100 hours, and exhibited poor heat resistance (Comparative Examples 18 and 19).

When the weight average molecular weight (Mw) of the hydrogenated block copolymer [D] was less than 60,000, the resulting film had low strength, and easily broke when stretched (or could not be stretched) (Comparative Example 22).

INDUSTRIAL APPLICABILITY

The specific hydrogenated block copolymer [D] according to the embodiments of the invention is a novel hydrogenated block copolymer that exhibits improved heat resistance, and a stretched film that includes the hydrogenated block copolymer [D], and exhibits improved heat resistance with respect to a change in retardation, is useful as an optical film (e.g., polarizing film and retardation film) that is used for a liquid crystal display.

The invention claimed is:
1. A hydrogenated block copolymer obtained by hydrogenating a block copolymer [C] that comprises two polymer blocks [A] and one polymer block [B], the polymer blocks [A] comprising a repeating unit [I] derived from an aromatic vinyl compound as a main component, and the polymer block [B] comprising a repeating unit [I] derived from an aromatic vinyl compound and a repeating unit [II] derived from a linear conjugated diene compound as main components,
  (i) a ratio (wA:wB) of a total weight fraction wA of the polymer blocks [A] in the block copolymer [C] to a weight fraction wB of the polymer block [B] in the block copolymer [C] being 45:55 to 65:35,
  (ii) a ratio (w[$I_B$]:w[$II_B$]) of a weight fraction w[$I_B$] of the repeating unit [I] derived from an aromatic vinyl compound in the polymer block [B] to a weight fraction w[$II_B$] of the repeating unit [II] derived from a linear conjugated diene compound in the polymer block [B] being 40:60 to 55:45,
  (iii) 90% of more of unsaturated bonds included in the block copolymer [C] having been hydrogenated,
  (iv) the hydrogenated block copolymer having a weight average molecular weight of 60,000 to 150,000, and
  (v) the hydrogenated block copolymer having a low-temperature-side glass transition temperature [$Tg_1$] determined by dynamic viscoelastic measurement of 0° C. or more, and having a high-temperature-side glass transition temperature [$Tg_2$] determined by dynamic viscoelastic measurement of 135° C. or more.

2. A stretched film comprising the hydrogenated block copolymer according to claim 1.

3. A method for producing the hydrogenated block copolymer according to claim 1, comprising a step of continuously adding a monomer mixture including an aromatic vinyl compound and a linear conjugated diene compound as the main components to the polymerization reaction system to form the polymer block [B] having a homogeneous monomer composition.

* * * * *